US012752484B2

(12) United States Patent
Gradzka-Kurzaj et al.

(10) Patent No.: US 12,752,484 B2
(45) Date of Patent: Oct. 6, 2026

(54) METHOD FOR ADDITIVE MANUFACTURING AND AN ADDITIVE MANUFACTURING APPARATUS

(71) Applicant: XTPL S.A., Wrocław (PL)

(72) Inventors: Iwona Gradzka-Kurzaj, Wrocław (PL); Piotr Kowalczewski, Łódź (PL)

(73) Assignee: XTPL S.A., Wroclaw (PL)

( * ) Notice: Subject to any disclaimer, the term of this patent is extended or adjusted under 35 U.S.C. 154(b) by 244 days.

(21) Appl. No.: 18/467,087

(22) Filed: Sep. 14, 2023

(65) Prior Publication Data

US 2025/0091292 A1 Mar. 20, 2025

(51) Int. Cl.

| | |
|---|---|
| ***B29C 64/232*** | (2017.01) |
| ***B29C 64/112*** | (2017.01) |
| ***B29C 64/209*** | (2017.01) |
| ***B29K 105/00*** | (2006.01) |
| ***B33Y 10/00*** | (2015.01) |
| ***B33Y 30/00*** | (2015.01) |

(52) U.S. Cl.

CPC .......... *B29C 64/232* (2017.08); *B29C 64/112* (2017.08); *B29C 64/209* (2017.08); *B33Y 10/00* (2014.12); *B33Y 30/00* (2014.12); *B29K 2105/0094* (2013.01)

(58) Field of Classification Search

CPC ... B29C 64/232; B29C 64/112; B29C 64/209; B29C 64/106; B33Y 10/00; B33Y 30/00; B29K 2105/0094

See application file for complete search history.

(56) References Cited

U.S. PATENT DOCUMENTS

| | | | | |
|---|---|---|---|---|
| 5,352,512 A * | 10/1994 | Hoffman | C04B 41/81 | 428/605 |
| 5,616,675 A * | 4/1997 | Wilkinson | C08G 18/10 | 528/80 |
| 8,304,089 B1 * | 11/2012 | Song | B22F 9/24 | 428/605 |
| 11,673,406 B2 * | 6/2023 | Granek | B41J 2/17596 | 347/85 |

(Continued)

FOREIGN PATENT DOCUMENTS

| | | |
|---|---|---|
| TW | 202313306 A | 4/2023 |
| WO | 2020157547 A1 | 8/2020 |

(Continued)

*Primary Examiner* — Nahida Sultana

(74) *Attorney, Agent, or Firm* — K&L Gates LLP

(57) ABSTRACT

A method for additive manufacturing and an additive manufacturing apparatus are provided. The method includes disposing a nozzle of a print head of an additive manufacturing system over a location on a substrate. An ink composition from the nozzle is deposited onto the location of the substrate while moving the nozzle away from the substrate to increase a distance therebetween, thereby forming a portion of a structure on the location. The method includes repeatedly, as necessary to increase a distance the portion of the substrate protrudes from the substrate, performing the following over the location: moving the nozzle away from the substrate while not depositing the ink composition, moving the nozzle towards the substrate, and dispensing the ink composition from the nozzle onto the structure while moving the nozzle away from the substrate.

22 Claims, 9 Drawing Sheets

(56) References Cited

U.S. PATENT DOCUMENTS

| | | | |
|---|---|---|---|
| 11,673,409 | B2 | 6/2023 | Granek et al. |
| 2009/0014916 | A1* | 1/2009 | Nagai .................. B41M 7/0081 264/401 |
| 2011/0073243 | A1* | 3/2011 | Yu ..................... C04B 35/62231 977/890 |
| 2017/0297111 | A1* | 10/2017 | Myerberg ............... B28B 1/001 |
| 2020/0001528 | A1* | 1/2020 | Tyler ....................... B29C 48/30 |
| 2020/0001540 | A1* | 1/2020 | McAlpine ............. B29C 64/106 |
| 2020/0023556 | A1* | 1/2020 | Kunc ...................... B29C 43/18 |
| 2021/0340391 | A1* | 11/2021 | Schädel ................. B33Y 70/00 |
| 2022/0212255 | A1 | 7/2022 | Gadzalinska et al. |
| 2022/0310397 | A1 | 9/2022 | Witczak et al. |
| 2022/0312596 | A1 | 9/2022 | Zajac et al. |
| 2022/0355377 | A1 | 11/2022 | Lysien et al. |
| 2022/0388211 | A1 | 12/2022 | Gadzalinska et al. |
| 2023/0183512 | A1 | 6/2023 | Lysien et al. |

FOREIGN PATENT DOCUMENTS

| | | | |
|---|---|---|---|
| WO | 2020157548 | A1 | 8/2020 |
| WO | 2021001763 | A1 | 1/2021 |
| WO | 2021019435 | A1 | 2/2021 |
| WO | 2021229435 | A1 | 11/2021 |
| WO | 2022172210 | A2 | 8/2022 |

* cited by examiner

METHOD FOR ADDITIVE MANUFACTURING AND AN ADDITIVE MANUFACTURING APPARATUS

BACKGROUND

Many printed circuit boards (PCBs) have electronic traces that are integrally manufactured within the PCB. Electronic components may be soldered on top of the PCB or addition connections or traces may be added. It has been challenging to create electrical connections on a PCB.

SUMMARY

The present disclosure provides a method of additive manufacturing. The method comprises disposing a nozzle of a print head of an additive manufacturing system over a first location on a substrate. An ink composition from the nozzle is deposited onto the first location of the substrate while moving the nozzle away from the substrate to increase a first distance therebetween, thereby forming a first portion of a structure on the first location. The method comprises repeatedly, as necessary to increase a second distance the first portion of the structure protrudes from the substrate, performing the following over the first location: moving the nozzle away from the substrate while not depositing the ink composition to increase the first distance, moving the nozzle towards the substrate to decrease the first distance, and dispensing the ink composition from the nozzle onto the structure while moving the nozzle away from the substrate to increase the first distance therebetween.

The present disclosure also provides a method of additive manufacturing. The method comprises disposing a nozzle of a print head of an additive manufacturing system over a first location on a substrate. An ink composition from the nozzle is deposited onto the first location of the substrate while moving the nozzle away from the substrate to increase a first distance therebetween, thereby forming a first portion of a structure on the first location. The method comprises repeatedly as necessary to increase a third distance the structure extends along the substrate, performing the following: disposing the nozzle over a subsequent location on the substrate, the subsequent location adjacent to the structure; and dispensing an ink composition from the nozzle onto the subsequent location of the substrate while moving the nozzle away from the substrate to increase the first distance therebetween, thereby forming an additional portion of the structure on the subsequent location and extending the third distance the structure extends along the substrate.

The present disclosure also provides an apparatus for additive manufacturing. The apparatus comprises a stage, a print head, a positioning system, and a controller. The stage is configured to support a substrate. The print head comprises a nozzle. The print head is configured to dispense an ink composition through the nozzle. The positioning system is configured to move the print head relative to the substrate. The controller is in electrical communication with the positioning system. The controller is configured to deposit an ink composition from the nozzle onto a first location of the substrate while moving the nozzle away from the substrate to increase a first distance therebetween, thereby forming a first portion of a structure on the first location. The controller is configured to repeatedly, as necessary to increase a second distance the first portion of the structure protrudes from the substrate, perform the following over the first location: move the nozzle away from the structure while not depositing the ink composition to form a gap between the nozzle and the structure, move the nozzle towards the structure to decrease the gap, and deposit the ink composition from the nozzle onto the structure while moving the nozzle away from the substrate to increase the first distance therebetween.

It is understood that the inventions described in this specification are not limited to the examples summarized in this Summary. Various other aspects are described and exemplified herein.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein.

Corresponding reference characters indicate corresponding parts throughout the several views. The exemplifications set out herein illustrate certain embodiments, in one form, and such exemplifications are not to be construed as limiting the scope of the appended claims in any manner.

DETAILED DESCRIPTION

Certain exemplary aspects of the present disclosure will now be described to provide an overall understanding of the principles of the structure, function, manufacture, and use of the compositions, methods, and products disclosed herein. One or more examples of these aspects are illustrated in the accompanying drawings. Those of ordinary skill in the art will understand that the devices and methods specifically described herein and illustrated in the accompanying drawings are non-limiting exemplary aspects and that the scope of the various examples of the present disclosure is defined solely by the claims. The features illustrated or described in connection with one exemplary aspect may be combined with the features of other aspects. Such modifications and variations are intended to be included within the scope of the present disclosure.

Any references herein to "various examples," "some examples," "one example," "an example," similar references to "aspects," or the like, means that a particular feature, structure, or characteristic described in connection with the example is included in at least one example. Thus, appearances of the phrases "in various examples," "in some examples," "in one example," "in an example," similar references to "aspects," or the like, in places throughout the specification are not necessarily all referring to the same example. Furthermore, the particular features, structures, or characteristics may be combined in any suitable manner in one or more examples. Thus, the particular features, structures, or characteristics illustrated or described in connection with one example may be combined, in whole or in part, with the features, structures, or characteristics of one or more other examples without limitation. Such modifications and variations are intended to be included within the scope of the present examples.

Figure 1:
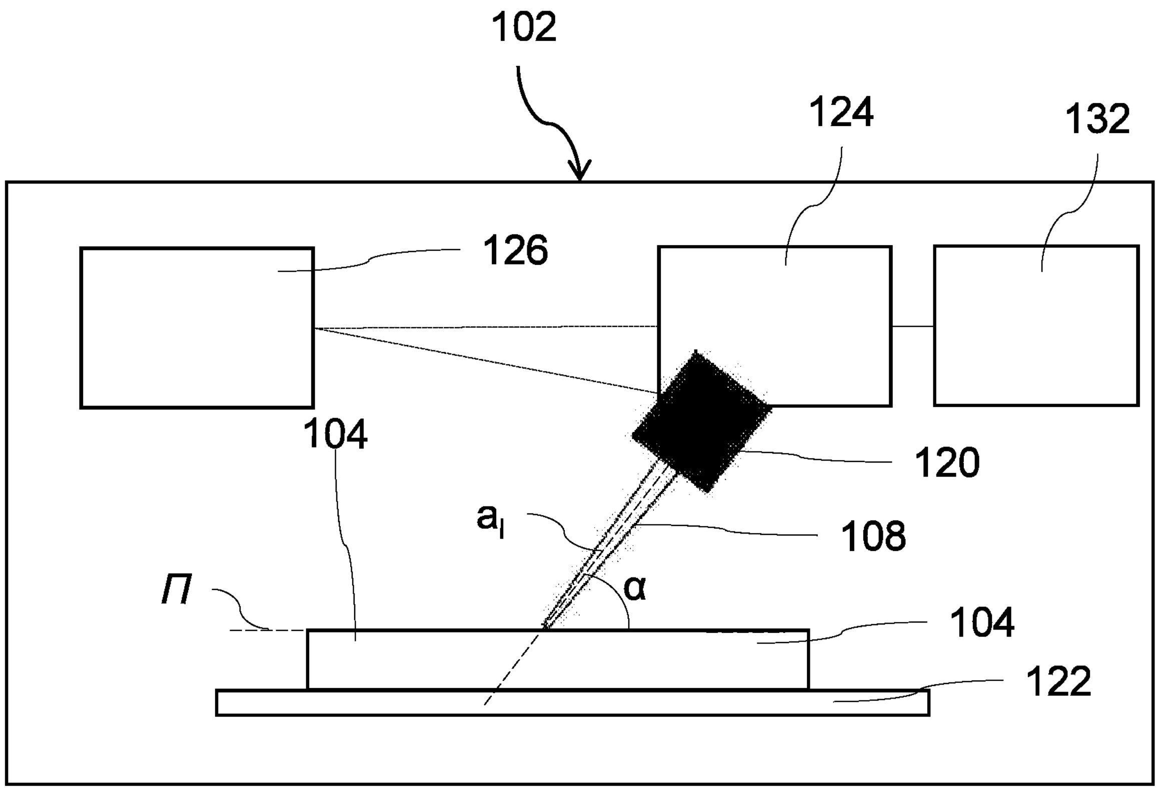
FIG. 1 is a schematic representation of an additive manufacturing apparatus according to the present disclosure.

The present disclosure provides a method for additive manufacturing and additive manufacturing system configured to perform the method. For example, the method can comprise printing electrically conductive traces on a substrate. Referring to FIG. 1, an example additive manufacturing system 102 according to the present disclosure is shown. The additive manufacturing system 102 can be configured to perform the methods as described herein and can comprise various hardware components in addition to a print head 120, which comprises a nozzle 108, to perform the methods as described herein. For example, the additive manufacturing system 102 can additionally comprise a stage 122 configured to support a substrate 104, a feed system (e.g., a pumping system) 132, a positioning system 124 (e.g., gantry) configured to move the print head 120 relative to the substrate 104, and a controller 126. The controller 126 can be in electrical communication with the positioning system 124, the feed system 132, and the print head 120. The feed system 132 can be in fluidic communication with the print head 120 and the nozzle 108.

As used herein, the term "controller" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or FPGA), state machine circuitry, firmware that stores instructions executed by programmable circuitry, and any combination thereof. The controller may, collectively or individually, be embodied as circuitry that forms part of a larger system, for example, an IC, an ASIC, a SoC, desktop computers, laptop computers, tablet computers, servers, smart phones, etc. Accordingly, as used herein, a "controller" can comprise electrical circuitry having at least one discrete electrical circuit, electrical circuitry having at least one IC, electrical circuitry having at least one application-specific IC, electrical circuitry forming a general-purpose computing device configured by a computer program (e.g., a general-purpose computer configured by a computer program that at least partially carries out processes and/or devices described herein or a microprocessor configured by a computer program that at least partially carries out processes and/or devices described herein), electrical circuitry forming a memory device (e.g., forms of RAM), and/or electrical circuitry forming a communications device (e.g., a modem, communications switch, or optical-electrical equipment). The subject matter described herein may be implemented in an analog or digital fashion or some combination thereof.

The additive manufacturing system 102 can be similar to the fluid printing apparatus described in International Patent Application Publication No. WO 2020/157547, titled FLUID PRINTING APPARATUS, published Aug. 6, 2020, which is herein incorporated by reference in its entirety.

Referring to FIG. 1, the substrate 104 can be a printed circuit board (PCB) or other electronic hardware component, such as, for example, an electrical circuit, a thin conductive film, a display, a micro-LED, an LED, an antenna, a sensor, a micropump, a photonic integrated circuit, a quantum dot display, smart glass, or other electronic article. For example, the substrate 104 can be at least partially coated with silicon and have various electronic components (e.g., pads, vias, resistors, capacitors, LEDs). As illustrated in FIG. 1, the substrate 104 is substantially rectangular. In various examples, the substrate 104 can be a different shape, such as for example, circular, triangular, pentagonal, hexagonal, or other shape.

As used herein, a referenced element or region that is "intermediate" two other elements or regions means that the referenced element/region is disposed between, but is not necessarily in contact with, the two other elements/regions. Accordingly, for example, a referenced element that is "intermediate" a first element and a second element may or may not be immediately adjacent to or in contact with the first and/or second elements, and other elements may be disposed between the referenced element and the first and/or second elements.

As illustrated, the print head 120 comprises the nozzle 108. The print head 120 is configured to dispense an ink composition through the nozzle 108. For example, the feed system 132 can be configured to apply a pressure in a range of 200 mbar to 10,000 mbar to the ink composition in the nozzle 108 to extrude the ink composition through the nozzle 108 and onto the substrate 104. For example, dispensing the ink composition through the nozzle 108 can comprise applying a pressure in a range of 100 mbar to 10,000 mbar to the ink composition in the nozzle 108 to extrude the ink composition through the nozzle 108, such as, for example, a pressure in a range of 200 mbar to 10,000 mbar, 1,000 mbar to 10,000 mbar, 2,000 mbar to 9,000 mbar, 2,000 mbar to 8,000 mbar, or 3,000 mbar to 7,000 mbar. Pressures as used herein refer to gauge pressure unless stated to the contrary.

The nozzle 108 can comprise a capillary tube. The capillary tube can comprise an internal diameter in a range of 0.1 μm to 10 μm, such as, for example, 1 μm to 10 μm or 1 μm to 3 μm. The capillary tube can comprise an outer diameter in a range of 0.2 μm to 20 μm, such as, for example, 1 μm to 10 μm or 0.7 μm to 8 μm.

Figure 5:
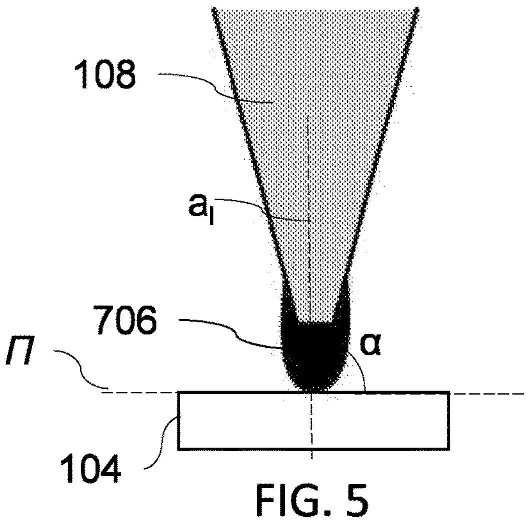
FIG. 5 is a schematic representation of a nozzle with a hydrophilic treatment dispensing an ink composition and the nozzle is positioned perpendicular to the substrate and the longitudinal axis of the nozzle is substantially vertical.
Figure 6:
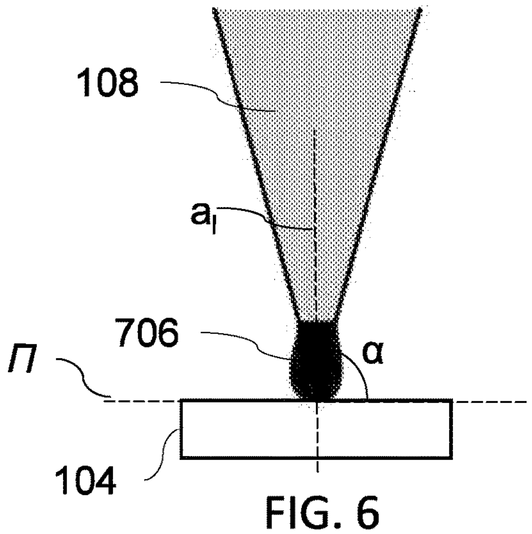
FIG. 6 is a schematic representation of a nozzle with a hydrophobic treatment dispensing an ink composition and the nozzle is positioned perpendicular to the substrate and the longitudinal axis of the nozzle is substantially vertical.
Figure 7:
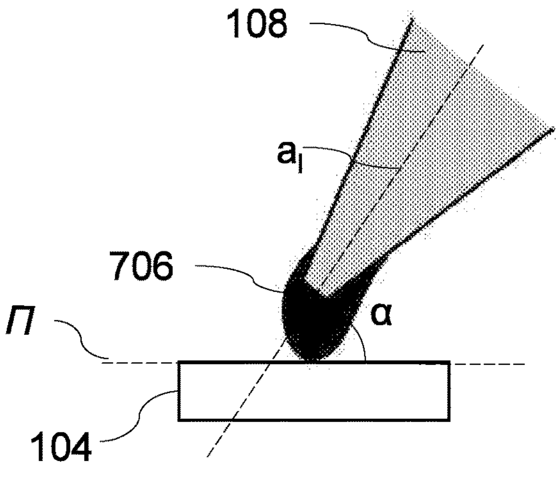
FIG. 7 is a schematic representation of a nozzle with a hydrophilic treatment dispensing an ink composition and the nozzle is positioned at an angle less than perpendicular relative to the substrate.
Figure 8:
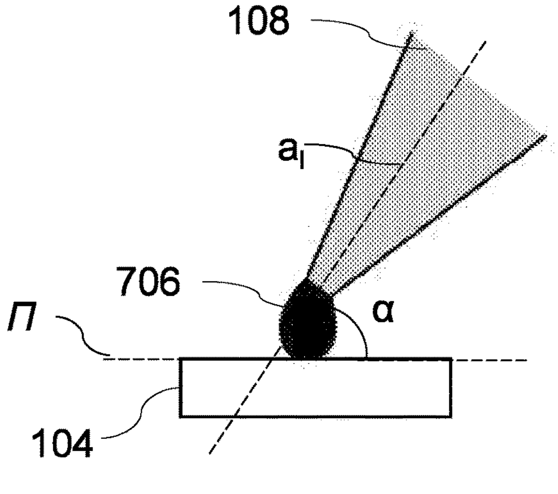
FIG. 8 is a schematic representation of a nozzle with a hydrophobic treatment dispensing an ink composition and the nozzle is positioned at an angle less than perpendicular relative to the substrate.

The nozzle 108 can define a longitudinal axis, $a_1$, and the substrate can define a plane, Π. An angle, α, of a longitudinal axis, $a_1$, relative to the plane, Π, of the substrate can be a range of 40 degrees to 90 degrees, such as, for example, 50 degrees to 90 degrees, 60 degrees to 90 degrees, 70 degrees to 90 degrees, or 80 to 90 degrees. As used herein, the angle, α, is the smaller of the two angles formed by an intersection of the longitudinal axis, $a_1$, and the plane, Π, unless both angles are equal and then the angle, α, can be either angle formed. The angle, α, can affect the structure built by the additive manufacturing system 102 as the ink composition can wet the exterior of the nozzle 108 and thus, the angle, α, can determine an approach angle of the ink composition to the surface and/or a structure built thereon. As illustrated in FIGS. 1, 7, and 8, the angle, α, can be less than 90 degrees. As illustrated in FIGS. 1, 5, and 6, the angle can be 90 degrees. Positioning the nozzle 108 such that the angle, α, is in a range of 70 degrees to 90 degrees can lead to enhanced aspect ratios of the structure 130. Decreasing a contact surface between the dispensed ink composition and the nozzle 108 can decrease the width of the structure 130. Positioning the nozzle 108 such that the angle, α, is in a range of 70 degrees to 90 degrees can reduce the surface of the nozzle 108 that interacts with the ink composition.

The nozzle 108 can be treated (e.g., coated) with a hydrophobic layer or a hydrophilic layer. As illustrated in FIGS. 5 and 7, the nozzle 108 is treated with a hydrophilic layer and ink composition 706 is being dispensed from the nozzle 108. As illustrated in FIGS. 6 and 8, the nozzle 108 is treated with a hydrophobic layer and ink composition 706 is being dispensed from the nozzle 108. The hydrophobic layer can comprise chlorotrimethylsilane, octadecyltrichlorosilane, or a combination thereof. Adding a hydrophobic layer to the nozzle 108 as illustrated in FIGS. 6 and 8 can lead to enhanced control of the process such that the surface of the nozzle 108 has a reduced interaction with the ink composition.

Referring again to FIG. 1, the print head 120, including the nozzle 108, may move and deposit the ink composition according to machine path instructions stored in memory (e.g., non-transitory memory) of the additive manufacturing system 102 and/or of memory of a device in signal communication with the additive manufacturing system 102. For example, the machine path instructions, when executed by the controller 126 and/or a controller of a device in signal communication with the additive manufacturing system 102, can cause the controller 126 to move the print head 120 and the nozzle 108 to a desired position and deposit the ink composition according to the machine path instructions.

Figure 2:
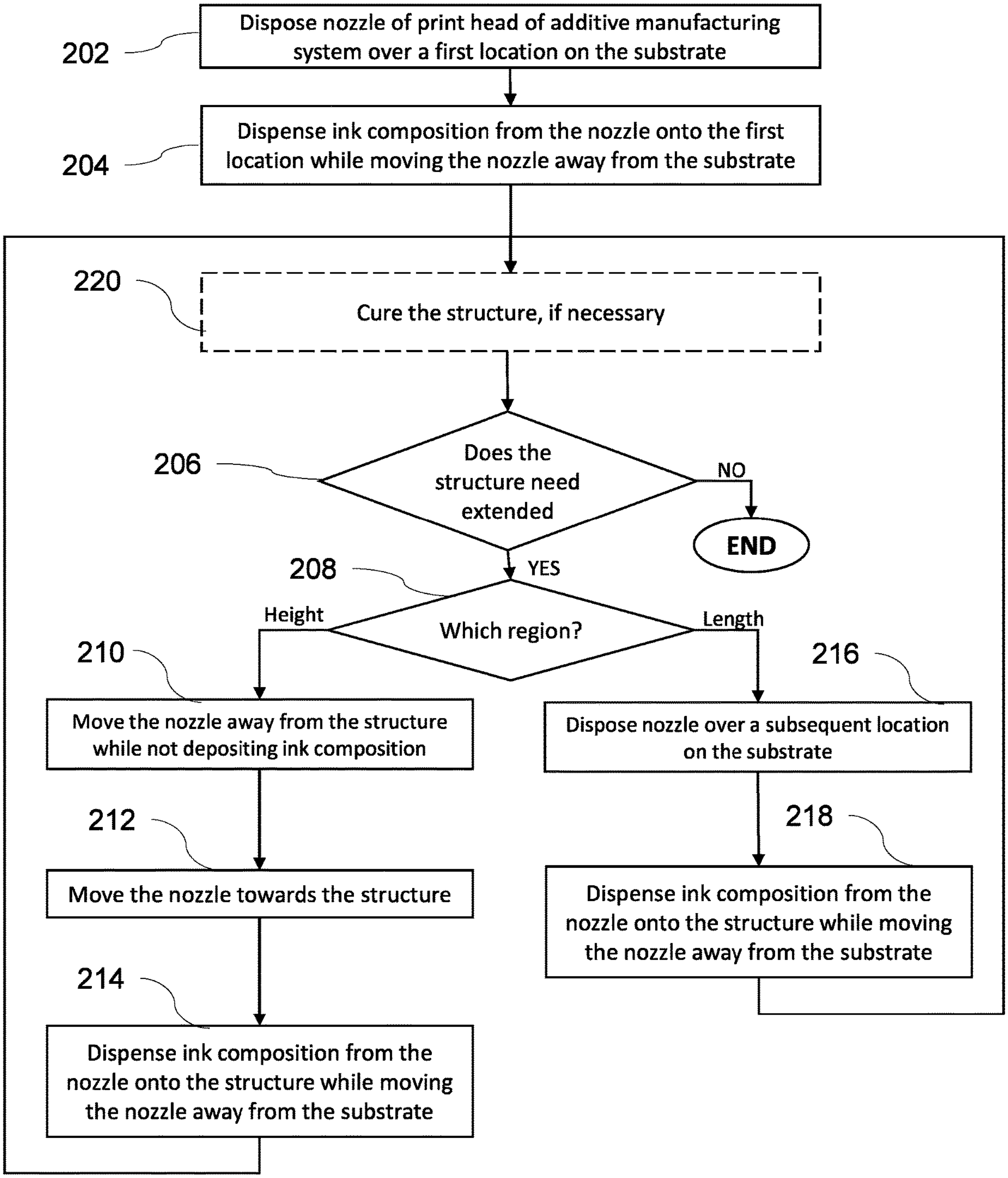
FIG. 2 is flow chart illustrating a method of additive manufacturing according to the present disclosure.
Figure 3A:
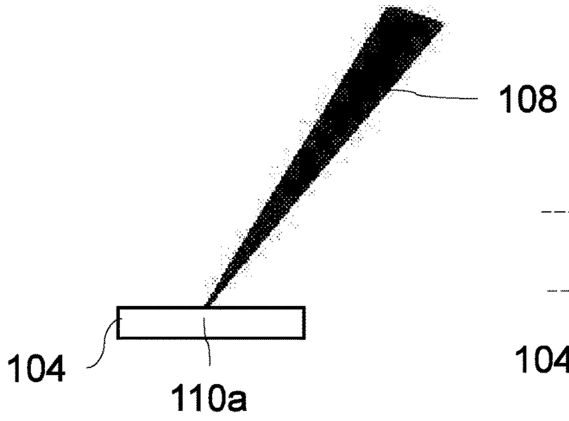
FIGS. 3A-3F illustrate the formation of a structure according to the method of the present disclosure.
Figure 3B:
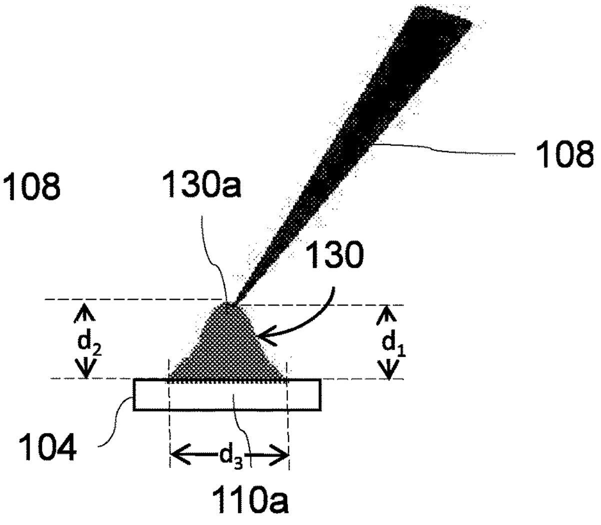

As illustrated in FIG. 2, the additive manufacturing system 102 can be configured to perform a method of additive manufacturing as described herein. The method comprises disposing the nozzle 108 of the print head 120 of the additive manufacturing system 102 over a first location **110*a* on the substrate 104 at step 202 and as shown in FIG. 3A. The ink composition is deposited from the nozzle 108 onto the first location 110*a* of the substrate 104 while moving the nozzle 108 away from the substrate 104 to increase a distance, $d_1$, therebetween, thereby forming a portion 130*a* of a structure 130 on the first location 110*a* at step 204**.

As used herein, the terms "on," "dispensed over," "dispensed onto," "formed over," "formed onto, "deposited over," "deposited onto," "overlay," "provided over," "provided onto," and the like, mean formed, overlaid, dispensed, deposited, or provided on but not necessarily in contact with the surface. For example, a composition "deposited onto" a substrate layer does not preclude the presence of one or more other layers of the same or different composition located between the composition and the substrate layer.

As illustrated in FIG. 2, the method proceeds to optional step 220, which includes curing the ink composition. Step 220 may occur after printing only a portion of the structure 130, after printing the entire structure 130, or a combination thereof. Curing the ink composition can comprise applying at least one stimulus selected from the group consisting of light and heat. For example, at step 220, the ink composition can be dried and/or sintered. The light can be infrared, visible, ultra-violet, or other light type depending on the application. The curing can be performed by heater, a flash lamp, a laser, or a combination thereof. For example, the structure 130 can be sintered in an oven at a temperature in a range of 300° C. to 500° C. for a time period of in a range of 5 minutes to 90 minutes. The structure 130 can be sintered by photonic sintering, such as by using a laser or a flash lamp. The sintering process can remove the polymer and/or other organic components from metal nanoparticles in the ink composition, thereby enhancing the conductivity of the structure 130 and curing the structure 130. Optionally, the structure 130 can be pre-processed in an oven set at a temperature in a range of 100° C. to 300° C. for a time period in a range of 5 minutes to 60 minutes prior to sintering.

The curing at step 220 can change as the method progresses. For example, portions of the structure 130 can be cured during the method by photonic sintering prior to deposition of additional portions and after the last portion of the structure 130 is deposited the entire structure can be sintered in an oven.

As used herein, the terms "cure" and "curing" refer to the chemical crosslinking of components in an ink applied as a layer over a substrate and/or the physical drying of an ink through solvent or carrier evaporation.

After curing at step 220, if performed, the method can comprise determining whether or not the structure 130 should be extended (e.g., increased in size) at step 206. If the determination at step 206 is negative, the method stops. If the determination at step 206 is positive, the method proceed to step 208.

At step 208, the method can comprise determining which region of the structure 130 should be extended. For example, the method can determine if a distance, $d_2$, the portion **130*a* of the structure 130 protrudes from the substrate 104 needs to be extended (e.g., an increase in height) or a distance, $d_3$, the structure 130 extends along the substrate 104** needs to be extended (e.g., an increase in length).

To increase the distance, $d_2$, steps 210, 212, and 214 can be performed over the first location **110*a*. At step 210, the nozzle 108 may be moved away from the substrate 104 and/or structure 130 while not depositing the ink composition to increase the distance, $d_1$, therebetween. Moving the nozzle 108 away from the substrate 104 while not depositing the ink composition can comprise at least moving the nozzle 108 vertically relative to the substrate 104. Moving the nozzle 108 while not depositing the ink composition can change the shape of the structure by elongating and/or stretching the structure 130 in the direction of movement of the nozzle 108. The movement can enhance the aspect ratio of the structure 130**.

As used herein "while not depositing the ink composition" refers to interrupting the deposition of ink onto the substrate 104. Ink composition may be accumulated in the nozzle 108 and/or on a surface of the nozzle 108 and can be inhibited from deposition onto the substrate. Reducing the pressure applied to the nozzle 108 by the feed system 132 compared to the pressure used to deposit the ink composition onto the substrate 104 can inhibit dispensing of ink composition from the nozzle and thereby inhibit deposition of the ink composition. Increasing the speed of movement of the nozzle 108 compared to the speed of movement of the nozzle 108 during deposition can inhibit deposition of the ink composition (e.g., the nozzle 108 can move vertically rapidly).

Figure 3C:
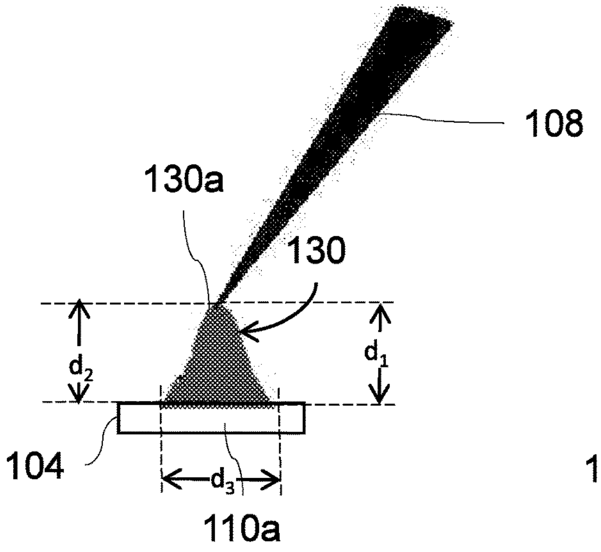
Figure 3D:
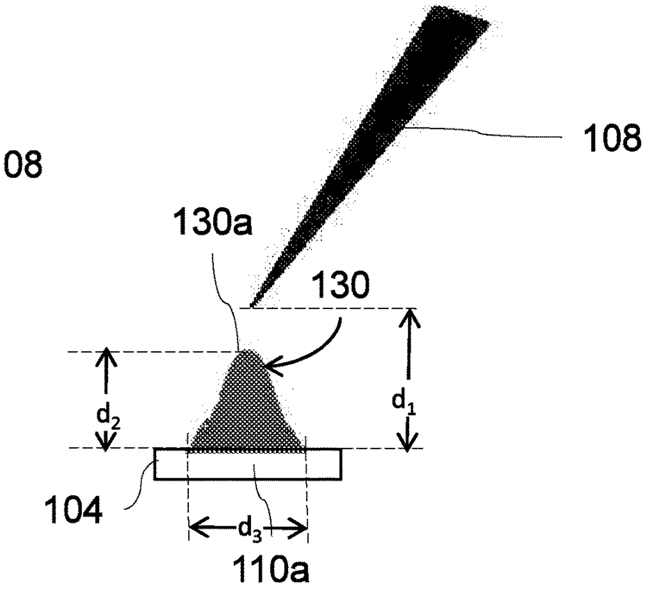

Referring to FIG. 3C, moving the nozzle 108 away from the substrate 104 while not depositing the ink composition can move the nozzle 108 to a position where contact between the nozzle 108 and the ink composition within the structure 130 is maintained.

Optionally, the nozzle 108 can apply a vacuum while moving to enhance elongation of the ink composition and/or maintain contact between the nozzle 108 and the structure 130. "Vacuum" relative to a pressure applied by the nozzle 108 as used herein refers to a pressure within the nozzle 108 that is less than the environmental pressure outside of the nozzle 108. The vacuum can be from 1 mbar of vacuum to 10,000 mbar of vacuum, such as, for example, 5 mbar of vacuum to 10,000 mbar of vacuum, 10 mbar of vacuum to 10,000 mbar of vacuum, or 100 mbar to 10,000 mbar of vacuum. The vacuum can be formed in the nozzle 108 by the feed system 132.

Referring to FIG. 3C, moving the nozzle 108 away from the substrate 104 while not depositing the ink composition can move the nozzle 108 to a position where a gap 328 can be formed between the nozzle 108 and the structure 130. The gap 328 can inhibit contact between the structure 130 and the nozzle 108 and enable the structure 130 to rebound elastically. Regardless if the gap 328 is formed, moving the nozzle 108 away from the substrate 104 while not depositing the ink composition can elongate the structure 130, thereby increasing the second distance, $d_2$ and an aspect ratio of the structure 130.

The movement of the nozzle 108 to increase the distance, $d_1$, while not depositing the ink composition can be based on at least one parameter selected from the group consisting of a wetability of the substrate 104, a viscosity of the ink composition, a surface tension of the ink composition, and a contact angle between the ink composition and the substrate 104. The movement of the nozzle 108 can be based on the ability of the ink composition to hold a suitable shape and/or a desired aspect ratio on the substrate 104.

Figure 3E:
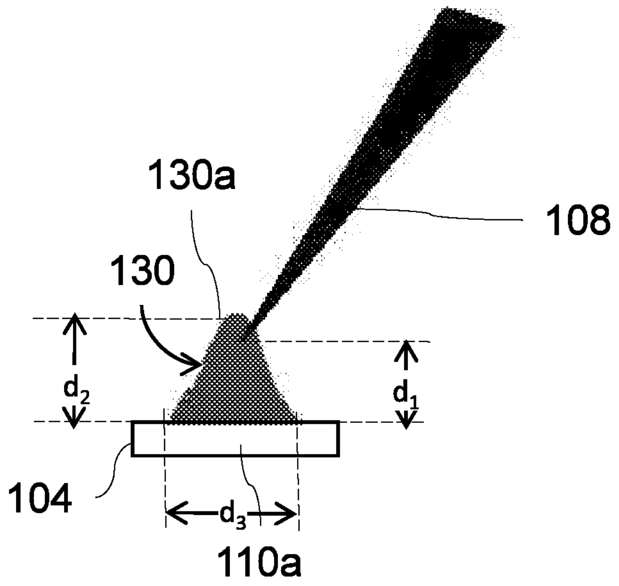

Referring again to FIG. 2, the method proceeds to step 212 where the nozzle may be moved towards the substrate 104 and/or structure 130 to decrease the distance, $d_1$ at illustrated in FIG. 3E. The ink composition may not be dispensed from the nozzle 108 while moving the nozzle 108 towards the substrate 104 and/or structure 130 to decrease the distance, $d_1$, at step 212.

Figure 3F:
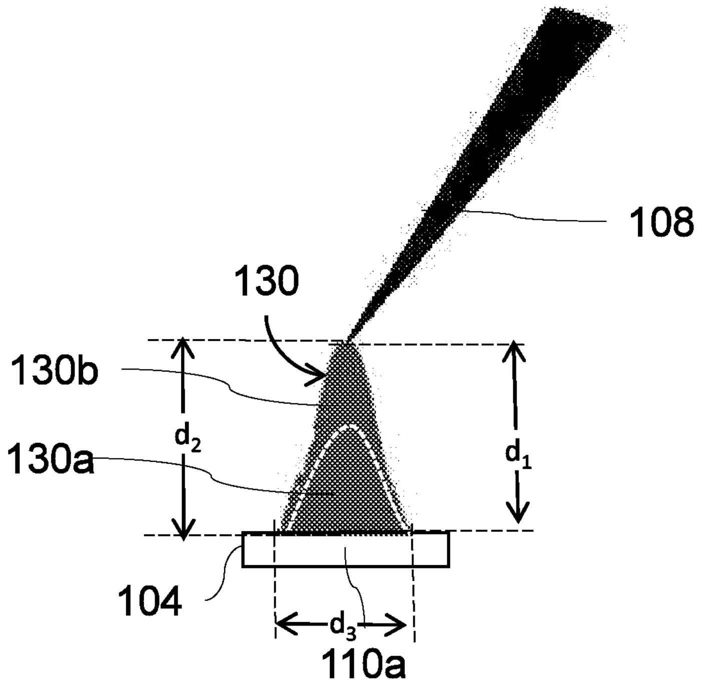

Referring again to FIG. 2, the method proceed to step 214 where the ink composition can be deposited from the nozzle 108 onto the structure 130 while moving the nozzle 108 away from the substrate 104 to increase the distance, $d_1$, therebetween. At step 214, the size of the structure 130 can be increased by forming a subsequent portion 130*b* and increasing the distance, $d_2$, the structure 130 extends from the substrate 104 as illustrated in FIG. 3F. The distance, $d_3$, may increase as a result of steps 210, 212, and 214 and the distance, $d_2$, will increase more than the distance, $d_3$, as a result of steps 210, 212, and 214.

Referring again to FIG. 2, following step 214, the method can return to step 206 as necessary to determine whether or not to continue to increase the distance, $d_2$, by repeating steps 210, 212, and 214 and/or to extend the structure 130 in a different manner. For example, the distance of any portion of the structure 130 protrudes from the substrate 104 can be extended at least two times or as necessary to create a desired distance the portion of the structure 130 protrudes from the substrate 104.

Figure 4A:
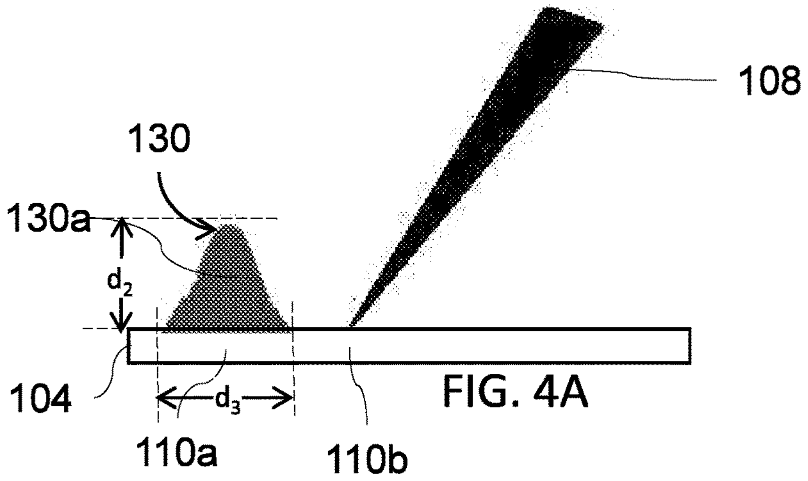
FIGS. 4A-4C illustrate the extension of a structure according to the method of the present disclosure.
Figure 4B:
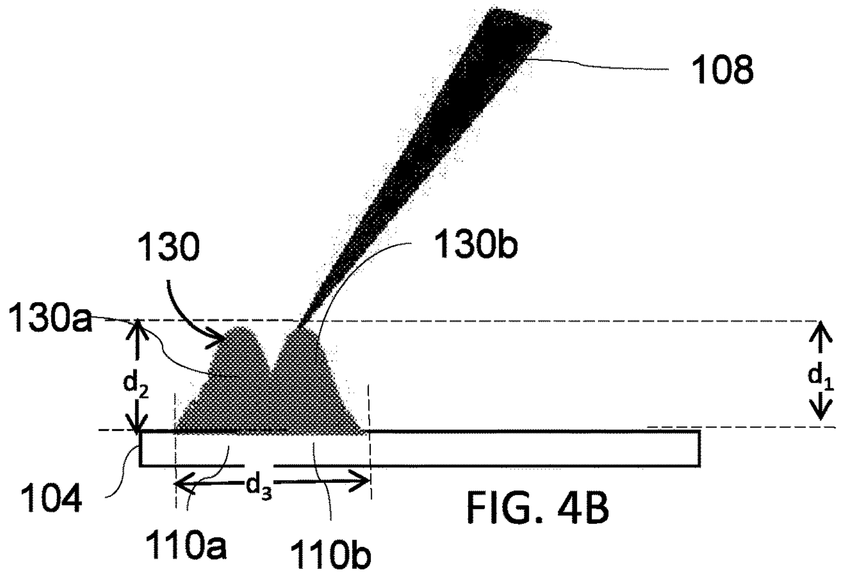

To increase the distance, $d_3$, steps 216 and 218 can be performed. For example, at step 216, the nozzle 108 can be disposed over a subsequent location 110*b* on the substrate 104 as illustrated in FIG. 4A. The subsequent location 110*b* can be adjacent to the structure 130. Disposing the nozzle 108 over the subsequent location 110*b* on the substrate can comprise at least moving the nozzle 108 horizontally relative to the substrate 104 from the first location 110 to the subsequent location 110*b* or from a previous subsequent location to a new subsequent location. Then, at step 218 in FIG. 2, the ink composition can be deposited from the nozzle 108 onto the subsequent location 110*b* of the substrate 104 while moving the nozzle 108 away from the substrate 104 to increase the distance, $d_1$, therebetween. Step 218 can form an additional portion, 130*c* of the structure 130 on the subsequent location and extend the distance, $d_3$, the structure extends along the substrate 104 as illustrated in FIG. 4B.

Figure 4C:
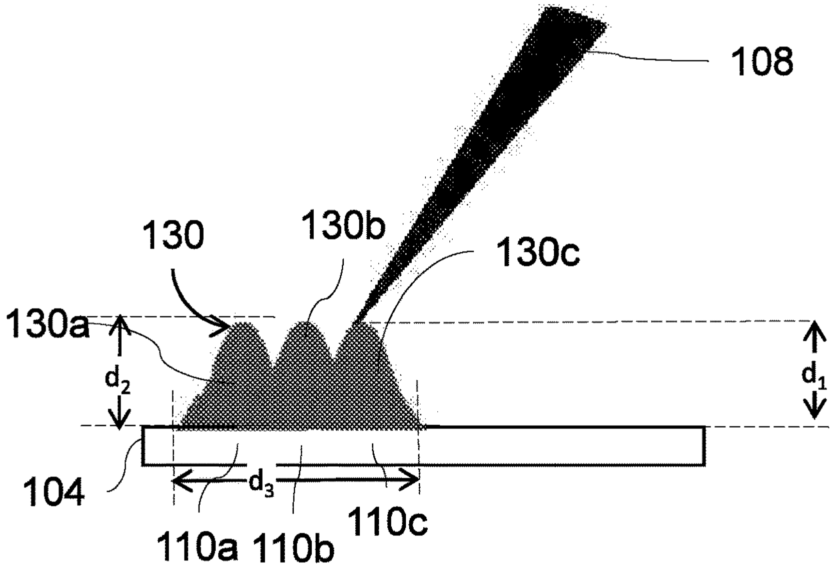

Referring again to FIG. 2, following step 214, the method can return to step 206 as necessary to determine whether or not to continue to increase the distance, $d_3$, by repeating steps 216 and 218 and/or to extend the structure 130 in a different manner. For example, at least two additional portions 130*c* and 130*d* of the structure 130 can be formed as illustrated in FIG. 4C, on at least two subsequent locations 110*b* and 110*c*.

The structure 130 can be formed in various shapes and sizes. For example, the structure 130 can comprise a line width of no greater than 100 μm, such as, for example, no greater than 10 μm. The structure 130 can comprise a line width in a range of 1 μm to 100 μm, such as, for example, 5 μm to 75 μm, 5 μm to 50 μm, 10 μm to 50 μm, 10 μm to 40 μm, 1 μm to 20 μm, or 1 μm to 10 μm. The structure 130 can comprise a height (e.g., distance, $d_2$) in a range of 1 μm to 50 μm, such as, for example, 5 μm to 50 μm. The structure 130 can comprise a line length as necessary to form an electrical connection.

The structure 130 can comprise a pillar, a trace, or a combination thereof. The structure 130 can be an electrically conductive feature, such as, an electrically conductive trace, an electrically conductive pillar, or a combination thereof.

The structure 130 can comprise an aspect ratio of at least 1, such as, for example, at least 1.1, at least 1.5, or at least 2. The structure 130 can comprise an aspect ratio in a range of 1 to 10, such as, for example, 1.1 to 10, 1.1 to 5, 1.5 to 5, 2 to 10, or 2 to 5. As used herein, an "aspect ratio" is a ratio of the height to the width of a structure. The height is measured from a base of the structure to a highest point of the structure. The width is measured at the base of the structure. The aspect ratio can be measured from a cross-section of the structure. Obtaining an desirable aspect ratio can enhance the electrical conductivity of a structure and/enhance the mechanical stability of a structure. For example, covering a high step on a substrate can be difficult with a low aspect ratio. The desirable aspect ratio can enable the formation of unique geometries, such as, for example, those required for antennas, micropumps, and/or the like.

The ink composition can comprise various conductive components, such as, for example, a metal, a metal alloy, a conductive carbon, or a combination thereof. For example, the ink composition can comprise metal nanoparticles, such as, for example, copper (e.g., elemental, an alloy, a compound) nanoparticles, gold (e.g., elemental, an alloy, a compound) nanoparticles, silver (e.g., elemental, an alloy, a compound) nanoparticles, or a combination thereof. The metal nanoparticles can have a mean average particle size of no greater than 500 nanometers, as measured with transmission electron microscopy, such as, for example no greater than 150 nanometer or no greater than 100 nanometers. The metal nanoparticles can comprise a metal bound to a polymer, such as, for example, polyvinylpyrrolidone.

The ink composition can comprise other components, such as, for example, a solvent (e.g., a polar protic solvent), a resin, or other compound. For example, the ink composition can comprise metal nanoparticles and a solvent. The ink composition can comprise at least 40% by weight metal nanoparticles based on the total weight of the ink composition, such as, for example, at least 50% by weight or at least 60% by weight metal nanoparticles all based on the total weight of the ink composition.

The ink composition can comprise a viscosity in a range of 100,000 cP to 10,000,000 cP as measured at 25 degrees Celsius with a rheometer with a 25 mm parallel plate spindle and a shear rate in a range of 0.1 $s^{-1}$ to 100 $s^{-1}$.

EXAMPLES

The present disclosure will be more fully understood by reference to the following examples, which provide illustrative non-limiting aspects of the invention. It is understood that the invention described in this specification is not necessarily limited to the examples described in this section.

Figure 9:
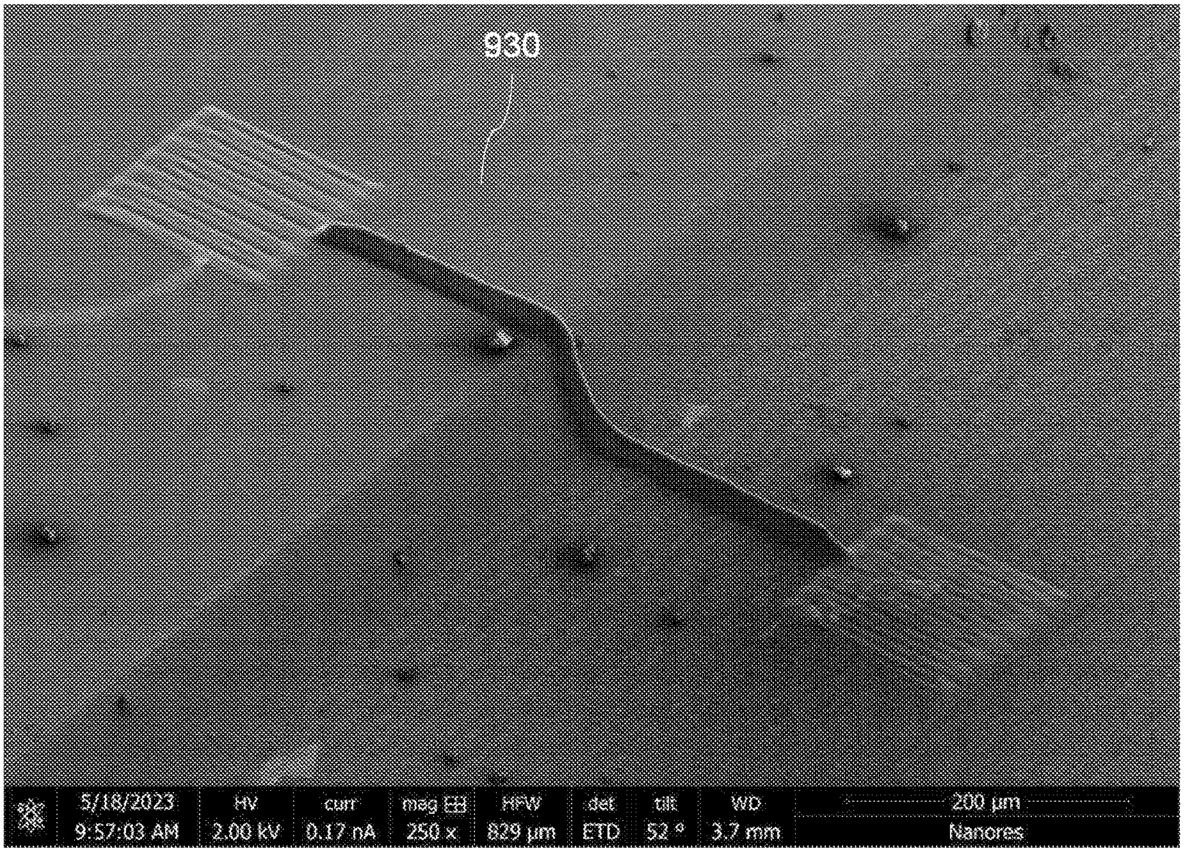
FIG. 9 is a scanning electron microscope (SEM) image of an electrically conductive trace printed according to the present disclosure.
Figure 10:
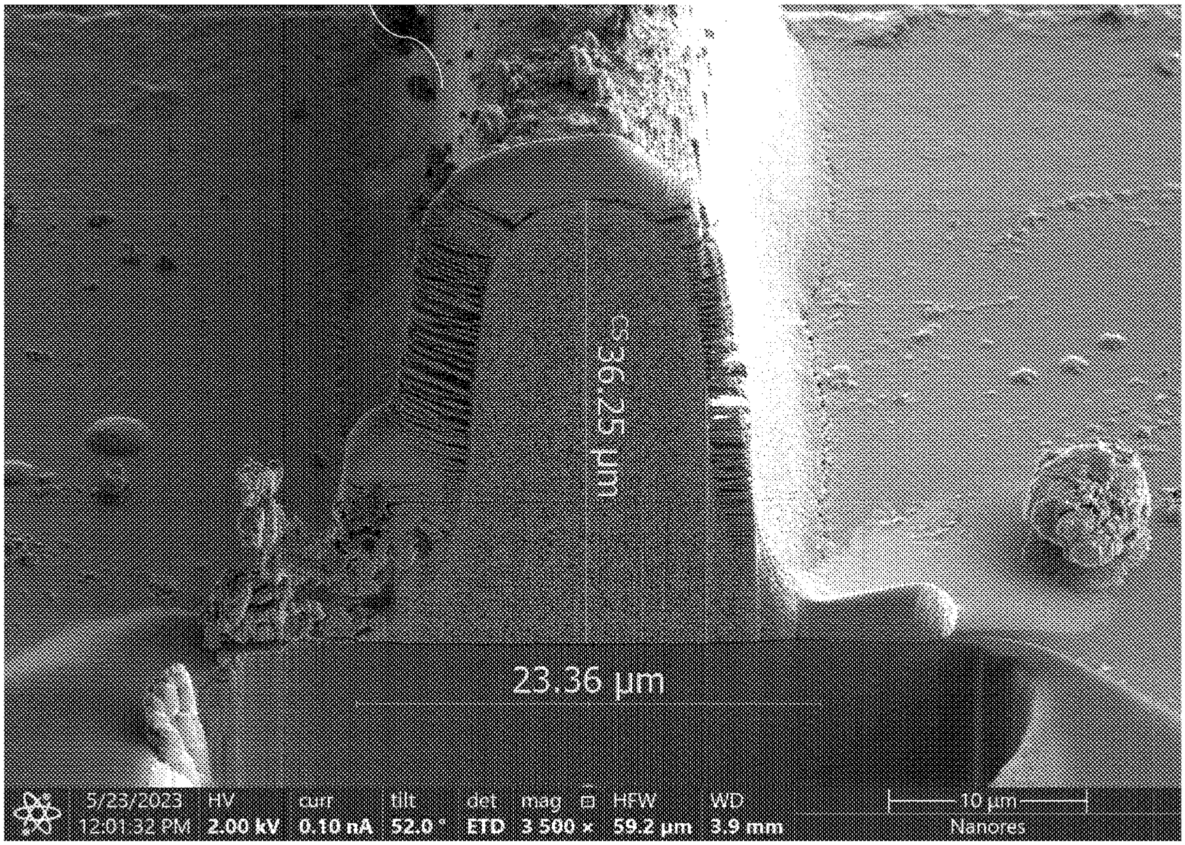
FIG. 10 is an SEM image of the electrically conductive trace of FIG. 9.

Structures were printed using the method according to the present disclosure. As illustrated in FIG. 9, an electrical trace 930 was additively manufactured according to the present disclosure. A cross-sectional view of the electrical trace 930 is shown in FIG. 10 and the height was measured to be 36.25 μm and the width was measured to be 23.36 μm resulting in an aspect ratio of with a desirable aspect ratio of 1.55.

Figure 11:
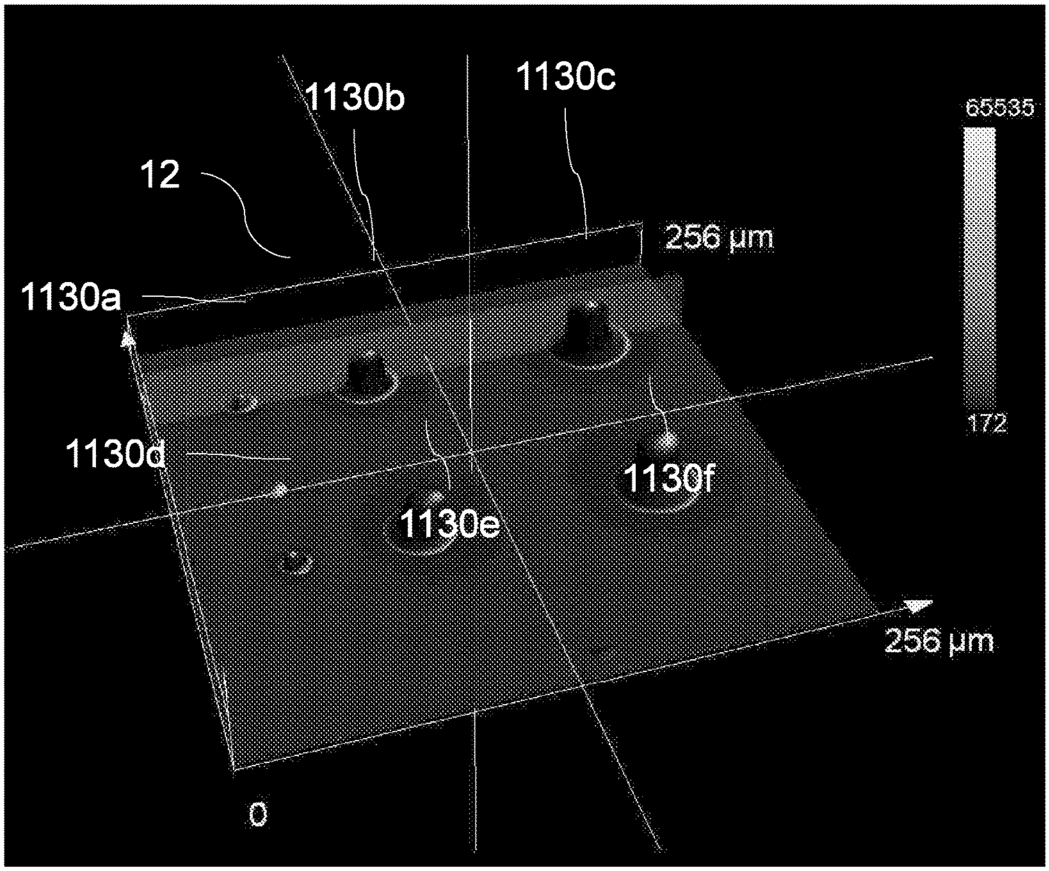
FIG. 11 is an image of a confocal microscope laser scan of structures printed with the method according to the present disclosure.
Figure 12:
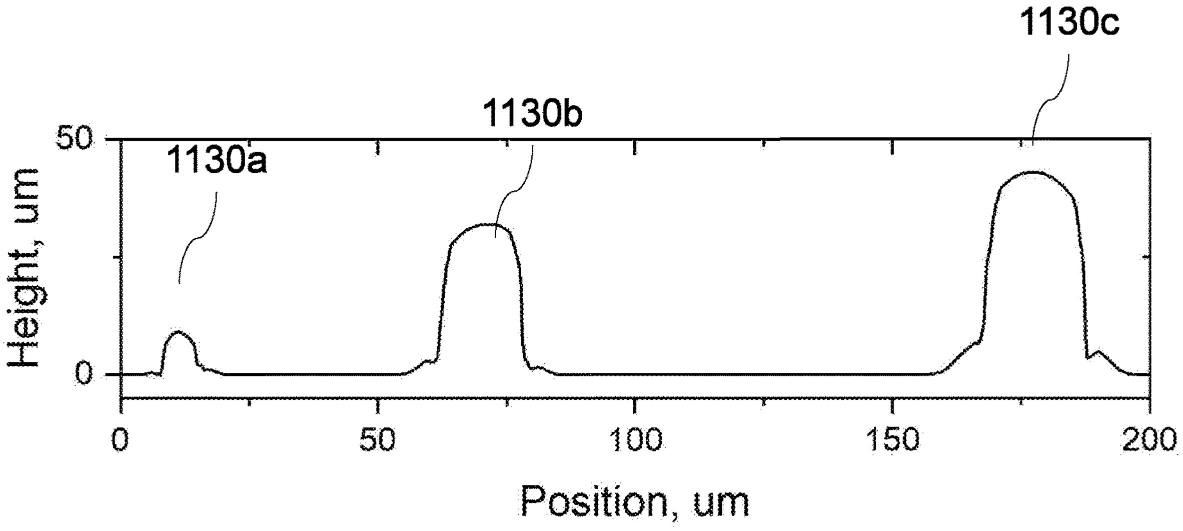
FIG. 12 is a cross-sectional diagram of the structures shown in FIG. 11 taken across plane 12.

As illustrated in FIG. 11, six pillar structures 1130_a-f_ were additively manufactured according to the present disclosure. The pillar structures 1130_a-f_ were determined to have a desirable aspect ratio as shown by the cross-sectional diagram in FIG. 12. Pillar structure 1130_b_ was determined to have an aspect ratio of 1.1 and pillar structure 1130_c_ was determined to have an aspect ratio of 1.1.

Various aspects of the invention include, but are not limited to, the aspects listed in the following numbered clauses.

Clause 1. A method of additive manufacturing, the method comprising: disposing a nozzle of a print head of an additive manufacturing system over a first location on a substrate; dispensing an ink composition from the nozzle onto the first location of the substrate while moving the nozzle away from the substrate to increase a first distance therebetween, thereby forming a first portion of a structure on the first location; and repeatedly, as necessary to increase a second distance the first portion of the structure protrudes from the substrate, performing the following over the first location: moving the nozzle away from the substrate while not depositing the ink composition to increase the first distance, moving the nozzle towards the substrate to decrease the first distance, and dispensing the ink composition from the nozzle onto the structure while moving the nozzle away from the substrate to increase the first distance therebetween.

Clause 2. The method of clause 1, further comprising repeatedly, as necessary to increase a third distance the structure extends along the substrate, performing the following: disposing the nozzle over a subsequent location on the substrate, the subsequent location adjacent to the structure; and dispensing an ink composition from the nozzle onto the subsequent location of the substrate while moving the nozzle away from the substrate to increase the first distance therebetween, thereby forming an additional portion of the structure on the subsequent location and extending a distance the structure extends along the substrate.

Clause 3. The method of clause 2, further comprising forming at least two additional portions of the structure, including the additional portion, on at least two subsequent locations, including the subsequent location.

Clause 4. The method of clause 3, further comprising repeatedly, as necessary, to increase a fourth distance each additional portion of the structure protrudes from the substrate, performing the following over each additional portion: moving the nozzle away from the substrate while not depositing the ink composition to increase the first distance, moving the nozzle towards the substrate to decrease the first distance, and dispensing the ink composition from the nozzle onto the structure while moving the nozzle away from the substrate to increase the first distance therebetween.

Clause 5. The method of any of clauses 2-4, wherein disposing the nozzle of the print head of the additive manufacturing system over the subsequent location on the substrate comprises at least moving the nozzle horizontally relative to the substrate from the first location.

Clause 6. The method of any of clauses 2-5, wherein moving the nozzle away from the substrate while not depositing the ink composition comprises at least moving the nozzle vertically relative to the substrate.

Clause 7. The method of any of clauses 1-6, wherein the ink composition is not dispensed from the nozzle while moving the nozzle towards the substrate to decrease the first distance.

Clause 8. The method of any of clauses 1-7, wherein the structure comprises an aspect ratio of at least 1.

Clause 9. The method of any of clauses 1-8, moving the nozzle away from the substrate while not depositing the ink composition further comprises forming a gap between the nozzle and the structure, wherein the gap inhibits contact between the structure and the nozzle.

Clause 10. The method of clause 9, wherein the structure rebounds elastically after forming the gap.

Clause 11. The method of any of clauses 1-10, wherein the structure comprises a pillar, a trace, or a combination thereof.

Clause 12. The method of any of clauses 1-11, wherein an angle of a longitudinal axis of the nozzle relative to a plane of the substrate is in a range of 90 degrees to 40 degrees.

Clause 13. The method of any of clauses 1-12, wherein the second distance is in a range of 1 μm to 50 μm.

Clause 14. The method of any of clauses 1-13, wherein a width of the structure is in a range of 1 μm to 10 μm.

Clause 15. The method of any of clauses 1-14, wherein the increase in the first distance by moving the nozzle away from the substrate while not depositing the ink composition is based on at least one parameter selected from the group consisting of a wetability of the substrate, a viscosity of the ink composition, a surface tension of the ink composition, and a contact angle between the ink composition and the substrate.

Clause 16. The method of any of clauses 1-15, further comprising curing the ink composition.

Clause 17. The method of clause 16, wherein curing the ink composition comprising applying at least one stimulus selected from the group consisting of light and heat.

Clause 18. The method of any of clauses 1-17, wherein dispensing an ink composition from the nozzle onto the first location comprises applying a pressure in a range of 100 mbar to 10000 mbar to the ink composition in the nozzle to extrude the ink composition through the nozzle and onto the first location on the substrate.

Clause 19. The method of any of clauses 1-18, wherein the ink composition comprises a viscosity in a range of 100,000 cP to 10,000,000 cP as measured at 25 degrees Celsius with a rheometer with a 25 mm parallel plate spindle and a shear rate in a range of 0.1 $s^{-1}$ to 100 $s^{-1}$.

Clause 20. The method of any of clauses 1-19, wherein the nozzle comprises a capillary tube having an outer diameter in a range of 0.7 μm to 8 μm.

Clause 21. The method of any of clauses 1-20, further comprising applying a vacuum with the nozzle while moving the nozzle away from the substrate to increase the first distance therebetween.

Clause 22. A method of additive manufacturing, the method comprising: disposing a nozzle of a print head of an additive manufacturing system over a first location on a substrate; dispensing an ink composition from the nozzle onto the first location of the substrate while moving the nozzle away from the substrate to increase a first distance therebetween, thereby forming a first portion of a structure on the first location; and repeatedly, as necessary to increase a third distance the structure extends along the substrate, performing the following: disposing the nozzle over a subsequent location on the substrate, the subsequent location adjacent to the structure; and dispensing an ink composition from the nozzle onto the subsequent location of the substrate while moving the nozzle away from the substrate to increase the first distance therebetween, thereby forming an additional portion of the structure on the subsequent location and extending the third distance the structure extends along the substrate.

Clause 23. An apparatus for additive manufacturing, the apparatus comprising: a stage configured to support a substrate; a print head comprising a nozzle, wherein the print head is configured to dispense an ink composition through the nozzle; a positioning system configured to move the print head relative to the substrate; and a controller in electrical communication with the positioning system, wherein the controller is configured to perform the method according to any one of clauses 1-22.

Clause 24. An apparatus for additive manufacturing, the apparatus comprising: a stage configured to support a substrate; a print head comprising a nozzle, wherein the print head is configured to dispense an ink composition through the nozzle; a positioning system configured to move the print head relative to the substrate; and a controller in electrical communication with the positioning system, wherein the controller is configured to deposit an ink composition from the nozzle onto a first location of the substrate while moving the nozzle away from the substrate to increase a first distance therebetween, thereby forming a first portion of a structure on the first location, and repeatedly, as necessary to increase a second distance the first portion of the structure protrudes from the substrate, perform the following over the first location move the nozzle away from the substrate while not depositing the ink composition to form a gap between the nozzle and the structure, move the nozzle towards the substrate to decrease the gap, and deposit the ink composition from the nozzle onto the structure while moving the nozzle away from the substrate to increase the first distance therebetween.

Clause 25. The apparatus of clause 24 further comprising a feed system configured to apply a pressure in a range of 100 mbar to 10,000 mbar to the ink composition in the nozzle to extrude the ink composition through the nozzle and onto the substrate.

Clause 26. The apparatus of any of clauses 24-25, wherein the ink composition comprises a viscosity in a range of 100,000 cP to 10,000,000 cP as measured at 25 degrees Celsius with a rheometer with a 25 mm parallel plate spindle and a shear rate in a range of 0.1 $s^{-1}$ to 100 $s^{-1}$.

Clause 27. The apparatus of any of clauses 24-26, wherein the nozzle comprises a capillary tube having an outer diameter in a range of 0.7 μm to 8 μm.

In this specification, unless otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited.

The grammatical articles "a," "an," and "the," as used herein, are intended to include "at least one" or "one or more," unless otherwise indicated, even if "at least one" or "one or more" is expressly used in certain instances. Thus, the articles are used herein to refer to one or more than one (i.e., to "at least one") of the grammatical objects of the article. Further, the use of a singular noun includes the plural, and the use of a plural noun includes the singular, unless the context of the usage requires otherwise.

Any patent, publication, or other disclosure material identified herein is incorporated by reference into this specification in its entirety unless otherwise indicated, but only to the extent that the incorporated material does not conflict with existing descriptions, definitions, statements, or other disclosure material expressly set forth in this specification. As such, and to the extent necessary, the express disclosure as set forth in this specification supersedes any conflicting material incorporated by reference. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicants reserve the right to amend this specification to expressly recite any subject matter, or portion thereof, incorporated by reference herein.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

One skilled in the art will recognize that the herein-described components, devices, operations/actions, and objects, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class, and the non-inclusion of specific components, devices, operations/actions, and objects should not be taken limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A method of additive manufacturing, the method comprising:

disposing a nozzle of a print head of an additive manufacturing system over a first location on a substrate;

dispensing an ink composition from the nozzle onto the first location of the substrate while moving the nozzle away from the substrate to increase a first distance therebetween, thereby forming a first portion of a structure on the first location wherein the ink composition comprises a viscosity in a range of 100,000 cP to 10,000,000 cP as measured at 25 degrees Celsius with a rheometer with a 25 mm parallel plate spindle and a shear rate in a range of 0.1 $s^{-1}$ to 100 $s^{-1}$; and repeatedly, as necessary to increase a second distance the first portion of the structure protrudes from the substrate, performing the following over the first location:

moving the nozzle away from the substrate while intentionally not depositing the ink composition to increase the first distance, thereby elongating the structure and increasing the second distance and an aspect ratio of the structure, after moving the nozzle away from the substrate, performing the following over the first location:

moving the nozzle towards the substrate to decrease the first distance, and dispensing the ink composition from the nozzle onto the structure while moving the nozzle away from the substrate to increase the first distance therebetween.

2. The method of claim 1, further comprising repeatedly, as necessary to increase a third distance the structure extends along the substrate, performing the following:

disposing the nozzle over a subsequent location on the substrate, the subsequent location adjacent to the structure; and dispensing an ink composition from the nozzle onto the subsequent location of the substrate while moving the nozzle away from the substrate to increase the first distance therebetween, thereby forming an additional portion of the structure on the subsequent location and extending a distance the structure extends along the substrate.

3. The method of claim 2, further comprising forming at least two additional portions of the structure, including the additional portion, on at least two subsequent locations, including the subsequent location.

4. The method of claim 3, further comprising repeatedly, as necessary, to increase a fourth distance each additional portion of the structure protrudes from the substrate, performing the following over each additional portion:

moving the nozzle away from the substrate while not depositing the ink composition to increase the first distance, moving the nozzle towards the substrate to decrease the first distance, and dispensing the ink composition from the nozzle onto the structure while moving the nozzle away from the substrate to increase the first distance therebetween.

5. The method of claim 2, wherein disposing the nozzle of the print head of the additive manufacturing system over the subsequent location on the substrate comprises at least moving the nozzle horizontally relative to the substrate from the first location.

6. The method of claim 1, wherein moving the nozzle away from the substrate while not depositing the ink composition comprises at least moving the nozzle vertically relative to the substrate.

7. The method of claim 1, wherein the ink composition is not dispensed from the nozzle while moving the nozzle towards the substrate to decrease the first distance.

8. The method of claim 1, wherein the aspect ratio is at least 1.

9. The method of claim 1, moving the nozzle away from the substrate while not depositing the ink composition further comprises forming a gap between the nozzle and the structure, wherein the gap inhibits contact between the structure and the nozzle.

10. The method of claim 9, wherein the structure rebounds elastically after forming the gap.

11. The method of claim 1, wherein the structure comprises a pillar, a trace, or a combination thereof.

12. The method of claim 1, wherein an angle of a longitudinal axis of the nozzle relative to a plane of the substrate is in a range of 90 degrees to 40 degrees.

13. The method of claim 1, wherein the second distance is in a range of 1 μm to 50 μm.

14. The method of claim 1, wherein a width of the structure is in a range of 1 μm to 10 μm.

15. The method of claim 1, wherein the increase in the first distance by moving the nozzle away from the structure while not depositing the ink composition is based on at least one parameter selected from the group consisting of a wetability of the substrate, a viscosity of the ink composition, a surface tension of the ink composition, and a contact angle between the ink composition and the substrate.

16. The method of claim 1, further comprising curing the ink composition.

17. The method of claim 16, wherein curing the ink composition comprising applying at least one stimulus selected from the group consisting of ultraviolet radiation and heat.

18. The method of claim 1, wherein dispensing an ink composition from the nozzle onto the first location comprises applying a pressure in a range of 100 mbar to 10000 mbar to the ink composition in the nozzle to extrude the ink composition through the nozzle and onto the first location on the substrate.

19. The method of claim 1, wherein the nozzle comprises a capillary tube having an outer diameter in a range of 0.7 μm to 8 μm.

20. The method of claim 1, further comprising applying a vacuum with the nozzle while moving the nozzle away from the substrate to increase the first distance therebetween.

21. A method of additive manufacturing, the method comprising:

disposing a nozzle of a print head of an additive manufacturing system over a first location on a substrate;

dispensing an ink composition from the nozzle onto the first location of the substrate while moving the nozzle away from the substrate to increase a first distance therebetween, thereby forming a first portion of a structure on the first location, wherein the ink composition comprises a viscosity in a range of 100,000 cP to 10,000,000 cP as measured at 25 degrees Celsius with a rheometer with a 25 mm parallel plate spindle and a shear rate in a range of 0.1 $s^{-1}$ to 100 $s^{-1}$; and repeatedly, as necessary to increase a third distance the structure extends along the substrate, performing the following:

disposing the nozzle over a subsequent location on the substrate, the subsequent location adjacent to the structure; and dispensing an ink composition from the nozzle onto the subsequent location of the substrate while moving the nozzle away from the substrate to increase the first distance therebetween, thereby forming an additional portion of the structure on the subsequent location and extending the third distance the structure extends along the substrate.

22. The method of claim 1, wherein moving the nozzle away from the substrate while intentionally not depositing the ink composition mechanically elongates the structure by stretching the structure in a direction of movement of the nozzle.

* * * * *